US011300663B2

(12) United States Patent
Wuthishuwong et al.

(10) Patent No.: US 11,300,663 B2
(45) Date of Patent: Apr. 12, 2022

(54) METHOD FOR PREDICTING A MOTION OF AN OBJECT

(71) Applicant: NEC Laboratories Europe GmbH, Heidelberg (DE)

(72) Inventors: Chairit Wuthishuwong, Wuppertal (DE); Francesco Alesiani, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 372 days.

(21) Appl. No.: 16/089,381

(22) PCT Filed: Mar. 31, 2016

(86) PCT No.: PCT/EP2016/057153
§ 371 (c)(1),
(2) Date: Sep. 28, 2018

(87) PCT Pub. No.: WO2017/167387
PCT Pub. Date: Oct. 5, 2017

(65) Prior Publication Data
US 2019/0113603 A1 Apr. 18, 2019

(51) Int. Cl.
*G01S 7/48* (2006.01)
*G01C 21/34* (2006.01)
(Continued)

(52) U.S. Cl.
CPC ............ *G01S 7/4808* (2013.01); *G01C 21/34* (2013.01); *G01S 13/726* (2013.01); *G01S 17/931* (2020.01); *G05D 1/024* (2013.01)

(58) Field of Classification Search
CPC .... G01S 7/4808; G01S 17/931; G01S 13/726; G01S 13/931; G01S 17/86;
(Continued)

(56) References Cited

U.S. PATENT DOCUMENTS 5,408,414 A * 4/1995 Nomoto ................. G05D 1/106
701/518
9,562,965 B2 * 2/2017 Georgy ................. G01S 5/0294
(Continued)

FOREIGN PATENT DOCUMENTS

JP      S 63213005 A     9/1988
JP      H04-363688 A    12/1992
(Continued)

OTHER PUBLICATIONS

Joseph, Joshua, et al. "A Bayesian nonparametric approach to modeling motion patterns." Autonomous Robots 31.4 (2011): 383-400. (Year: 2011).*
(Continued)

*Primary Examiner* — Yoshihisa Ishizuka
*Assistant Examiner* — Carter W Ferrell
(74) *Attorney, Agent, or Firm* — Leydig, Voit & Mayer, Ltd.

(57) ABSTRACT

A method for predicting a motion of an object includes predicting the motion of the object based on predicted future sensor readings. The predicted future sensor readings are computed based on current measurement data of one or more range sensors.

13 Claims, 9 Drawing Sheets

(51) Int. Cl.
*G01S 13/72* (2006.01)
*G05D 1/02* (2020.01)
*G01S 17/931* (2020.01)

(58) Field of Classification Search
CPC ......... G01S 2013/93271; G01S 13/867; G01S 17/42; G01C 21/34; G05D 1/024; G05D 2201/0213; G05D 1/0274; G05D 1/0088; G05D 1/0212; G05D 1/0246; G05D 1/0214; G05D 1/0221; G05D 1/0231; G05D 1/0044; G05D 1/0248; G05D 1/0011; G06K 9/00805; G06K 9/00664; G06K 9/00791; G06K 9/00798; G06K 9/6267; G06K 2009/3291; G06K 9/6218; G06K 9/4604; G06K 2209/21; G08G 1/165; G06N 20/00; G06T 2207/30261; G06T 7/246; G06T 2207/30252; G06T 7/20; G06T 7/277; B60W 50/0097; B60W 30/0956; B60W 2556/50
See application file for complete search history.

(56) References Cited

U.S. PATENT DOCUMENTS

| | | | |
|---|---|---|---|
| 2003/0065409 A1* | 4/2003 | Raeth | G05B 23/0254 700/31 |
| 2010/0106356 A1* | 4/2010 | Trepagnier | G08G 1/16 701/25 |
| 2010/0121488 A1 | 5/2010 | Lee et al. | |
| 2010/0191391 A1* | 7/2010 | Zeng | G01S 13/87 701/1 |
| 2012/0116662 A1* | 5/2012 | Zeng | G05D 1/024 701/300 |
| 2015/0153452 A1 | 6/2015 | Yamamoto et al. | |
| 2017/0225760 A1* | 8/2017 | Sidki | B63B 35/00 |
| 2018/0336701 A1* | 11/2018 | Yokota | B60R 21/00 |

FOREIGN PATENT DOCUMENTS

| | | |
|---|---|---|
| JP | 2004362469 A | 12/2004 |
| JP | 2006221310 A | 8/2006 |
| JP | 2010534334 A | 11/2010 |
| JP | 2011196749 A | 10/2011 |
| JP | 2015105870 A | 6/2015 |

OTHER PUBLICATIONS

Kalman R E: "A New Approach to Linear Filtering and Prediction Problems", Transactions of the American Society of Mechanical Engineers, Series D: Journal of Basic Engineering, American Society of Mechanical Engineers, New York, NY, US, vol. 82, Mar. 1, 1960 (Mar. 1, 1960), pp. 35-45, XP008039411.

Edward Snelson et al: "Local and global sparse Gaussian process approximations", Proceedings of the Eleventh International Conference on Artificial Intelligence and Statistics, vol. 2, Oct. 27, 2007 (Oct. 27, 2007), pp. 524-531, XP055328353.

Huijing Zhao et al: "Monitoring an intersection using a network of laser scanners", Intelligent Transportation Systems, 2008. ITSC 2008. 11th International IEEE Conference On, IEEE, Piscataway, NJ, USA, Oct. 12, 2008 (Oct. 12, 2008), pp. 428-433, XP031383424.

LV Yongle: "An adaptive real-time outlier detection algorithm based on ARMA model for radar's health monitoring", 2015 IEEE AUTOTESTCON, IEEE, Nov. 2, 2015 (Nov. 2, 2015), pp. 108-114, XP032832826.

Regis Lherbier et al: "Use of contextual information by Bayesian Networks for multi-object tracking in scanning laser range data", Intelligent Transport Systems Telecommunications, (ITST), 2009 9th International Conference On, IEEE, Piscataway, NJ, USA, Oct. 20, 2009 (Oct. 20, 2009), pp. 97-102, XP031619211.

Ko J et al: "GP-BayesFilters: Bayesian filtering using Gaussian process prediction and observation models", Intelligent Robots and Systems, 2008. IROS 2008. IEEE/RSJ International Conference On, IEEE; Piscataway, NJ, USA, Sep. 22, 2008 (Sep. 22, 2008), pp. 3471-3476, XP032335785.

Lee Donghan et al: "Interacting multiple model-based human motion prediction for motion planning of companion robots", 2015 IEEE International Symposium on Safety, Security, and Rescue Robotics (SSRR), IEEE, Oct. 18, 2015 (Oct. 18, 2015), pp. 1-7, XP032887131.

* cited by examiner

METHOD FOR PREDICTING A MOTION OF AN OBJECT

CROSS-REFERENCE TO PRIOR APPLICATION

This application is a U.S. National Stage Application under 35 U.S.C. § 371 of International Application No. PCT/EP2016/057153 filed on Mar. 31, 2016. The International Application was published in English on Oct. 5, 2017, as WO 2017/167387 A1 under PCT Article 21(2).

FIELD

The present invention relates to predicting a motion of an object.

BACKGROUND

Autonomous and automated driving requires defining a safe trajectory of the vehicle which is able to proceed in the task avoiding static and dynamic obstacles. The prediction capability of the autonomous driving component is important also to meet smoothness and comfort requirements.

Conventional techniques for prediction or estimation include the presence of inaccuracy and noisy measurement. An example of such a technique is the Kalman-Bucy filter. The conventional technique for object motion prediction is to directly estimate the motion of the object based on the current motion and historical motion after mapping the raw measurement data into local or global coordinates. Because most conventional techniques have an assumption that the measurements are not reliable, they attempt to improve this noisy measurement before determining the object motion and then, using only the outcome in order to predict the future object motion.

Conventional motion planning is generating the real time trajectory by using the real time feedback data. However, knowing the object motion provides information for solving potential conflicts that might happen in the near future. With this information a robot for example can produce a continuous trajectory for the limited future time horizon.

SUMMARY

An embodiment of the present invention provides a method for predicting a motion of an object that includes predicting the motion of the object based on predicted future sensor readings. The predicted future sensor readings are computed based on current measurement data of one or more range sensors.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Although applicable in general to any kind of object, the present invention will be described with regard to vehicles like autonomous robots or the like.

Since object motion naturally is time varying, identifying the object motion in the future is difficult. The object motion changes over time either with linear or nonlinear relationship.

Figure 1:
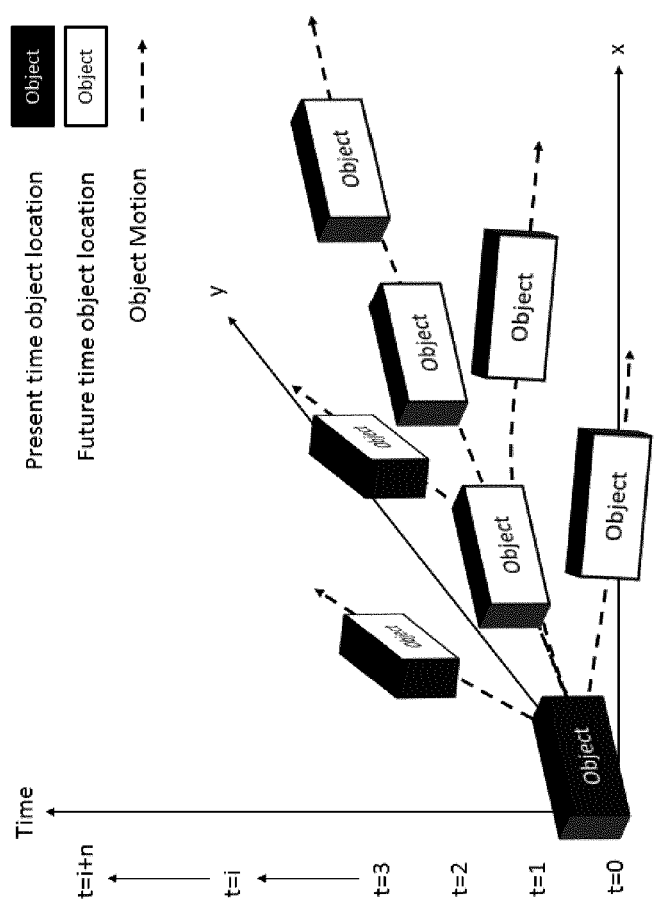
FIG. 1 shows a time variant object motion.
Figure 2:
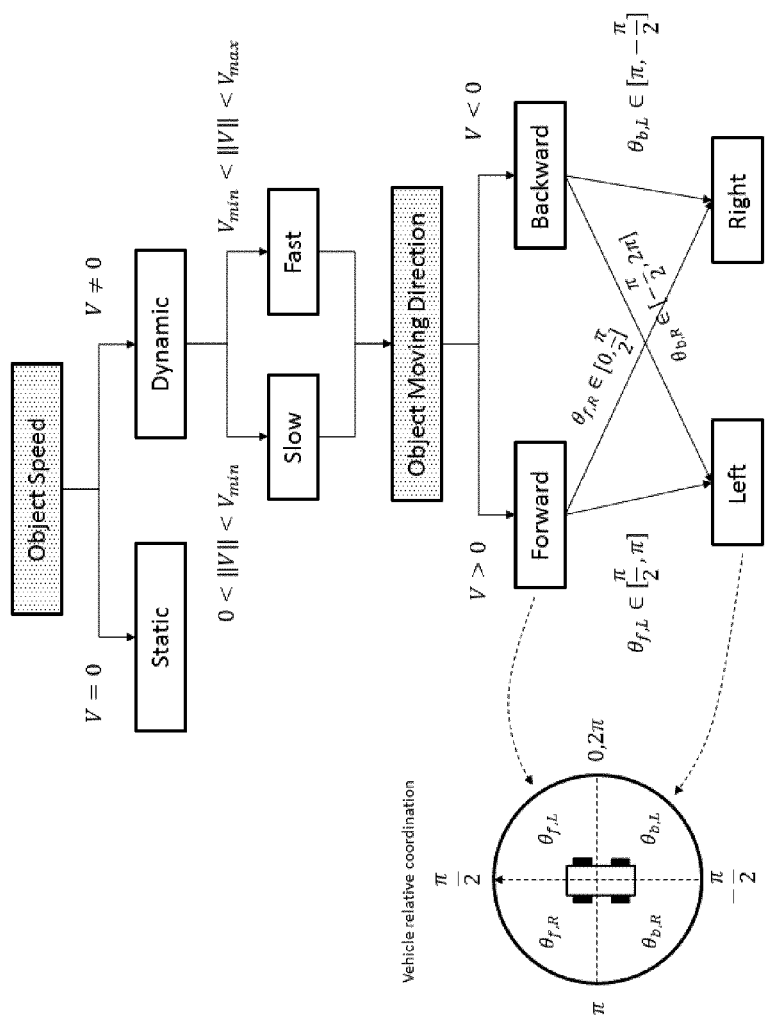
FIG. 2 shows a method for determining object motion and steering.

FIG. 1 shows the multiple variations of the object motion over the time. Problems which arise are illustrated in FIG. 2. They may be categorized into two points:
1. The speed of the object: Information whether this object is static or dynamic and approximate how fast the object move.
2. The moving direction of object: Information where the object will go.

Embodiments of the present invention enable a higher accuracy when predicting a motion of an object.

Embodiments of the present invention provide a smooth and reliable motion of an object.

In an embodiment, the present invention provides a method for predicting a motion of an object, where the motion of the object is predicted based on predicted future sensor readings, where the predicted future sensor readings are computed based on current measurement data of one or more range sensors.

In a further embodiment, the present invention provides a computing entity for predicting a motion of an object, including an input interface for receiving data of one or more range sensors, an output interface for output a predicted motion of the object and computation means including a processor and a memory, being adapted to predict the motion of the object is predicted based on predicted future sensor readings, where the predicted future sensor readings are computed based on current measurement data of one or more range sensors.

In a further embodiment, the present invention provides a non-transitory computer readable medium storing a program causing a computer to execute a method predicting a motion of an object, where the motion of the object is predicted based on predicted future sensor readings, where the predicted future sensor readings are computed based on current measurement data of one or more range sensors.

The term "object" is in particular in the claims, preferably in the specification, to be understood in its broadest sense and relates to any static or moving physical entity.

The term "motion" with regard to "object" is to be understood in its broadest sense and refers preferably in the claims, in particular in the specification, to the information related to the object associated with a state and/or movement of the object.

The term "obstacle" is to be understood in his broadest sense and refers preferably in the claims, in particular in the specification, to any kind of object which might be able to cross the trajectory, path or the like of another object and is detectable by sensors.

The terms "computing device" or "computing entity", etc. refer in particular in the claims, preferably in the specification each to a device adapted to perform computing like a personal computer, a tablet, a mobile phone, a server, a router, a switch or the like and includes one or more processors having one or more cores and may be connectable to a memory for storing an application which is adapted to perform corresponding steps of one or more of the embodiments of the present invention. Any application may be software based and/or hardware based installed in the memory on which the processor(s) can work on. The computing devices or computing entities may be adapted in such a way that the corresponding steps to be computed are performed in an optimized way. For instance different steps may be performed in parallel with a single processor on different of its cores. Further the computing devices or computing entities may be identical forming a single computing device.

The term "computer readable medium" may refer to any kind of medium, which can be used together with a computation device or computer and on which information can be stored. The information may be any kind of data which can be read into a memory of a computer. For example the information may include program code for executing with the computer. Examples of a computer readable medium are tapes, CD-ROMs, DVD-ROMs, DVD-RAMs, DVD-RWs, BluRay, DAT, MiniDisk, solid state disks SSD, floppy disks, SD-cards, CF-cards, memory-sticks, USB-sticks, EPROM. EEPROM or the like.

Further features, advantages and further embodiments are described or may become apparent in the following:

The motion of the object may be predicted further based on historic measurement data of the one or more range sensors. This enables a more precise prediction of a motion of an object.

A point clustering may be performed on the current and on historic measurement data of the one or more range sensors and current object state data based on a distance between two points resulting in one or more clusters and where future clusters are predicted and the object is identified in a predicted cluster to predict the motion of the object This enhances the precision of the prediction of a motion of an object.

At least two different prediction methods may be used to compute method-dependent predicted future sensor readings. This even further enhances robustness and precision of the object motion prediction since the outcome of different prediction methods can be combined to obtain a more precise and robust object motion prediction.

The method-dependent predicted future sensor readings of the at least two prediction methods may be weighed and combined to obtain the predicted sensor readings. This enables in a very flexible way to provide a more precise combination of the predicted sensors readings.

The predicted sensor readings may be corrected during computing by using Gaussian Process Approximation. This enables to predict computer sensor measurements based on the corrected trend with the Gaussian Process Approximation. Gaussian Process Approximation is for example disclosed in the non-patent literature of Snelson, Edward, Ghahramani, Z. "Local and global sparse Gaussian process approximations", Gatsby Computational Neuroscience Unit, University College London, UK.

A future cluster may be predicted using a Kalman filter for a movement of the cluster. A Kalman filter provides linear quadratic estimation using a series of measurements observed over time including statistical noise, etc. and the output of a Kalman filtering provides estimates of unknown variables tending to be more precise than those which are based on a single measurement. Kalman filtering is for example disclosed in the non-patent literature of Kalman, R. E., 1960, "A new approach to linear filtering and prediction problems", Journal of Basic Engineering 82:35. Doi: 10.111.5/1.3662552.

Historical data of one ore more range sensors may be used for a computing the predicted sensor readings. This further enhances the precision of the object motion prediction since historical data can be used to train either online or offline the computation of the object motion prediction.

Motion prediction feedback of that the object may be included when computing the predicted motion of the object. This further allows to refine the prediction of a motion of an object taking into account motion feedback of the object itself.

The range sensors may be provided in form of Light Detection and Ranging LIDAR sensors. LIDAR sensors enable light detection and ranging, i.e. LIDAR sensors enable optical range and velocity measurements by use of for example light of a laser or the like.

There are several ways how to design and further develop the teaching of the present invention in an advantageous way. To this end it is to be referred to the patent claims subordinate to the independent claims on the one hand and to the following explanation of further embodiments of the invention by way of example, illustrated by the figures on the other hand. In connection with the explanation of the further embodiments of the invention by the aid of the figures, generally further embodiments and further developments of the teaching will be explained.

FIG. 1 shows a time variant object motion.

In FIG. 1, a time variant object motion is shown beginning at the object location at the present time t=0. The object moves then in x-y-direction over time t.

FIG. 2 shows a method for determining object motion and steering.

In FIG. 2, describing parameters for an object movement of a vehicle like a car are shown. For example the object speed can be either static or dynamic, i.e. the vehicle moves or not. In case the vehicle moves, i.e. is "dynamic", the object speed may be categorized into "slow" or "fast" where "slow" means the velocity below a certain threshold and "fast" above a certain threshold until the maximum possible speed of the object. Considering the object speed also the moving direction "forward" or "backward" and of course the steering of the object can be "left" or "right" in both directions, i.e. "forward" or "backward".

Figure 3:
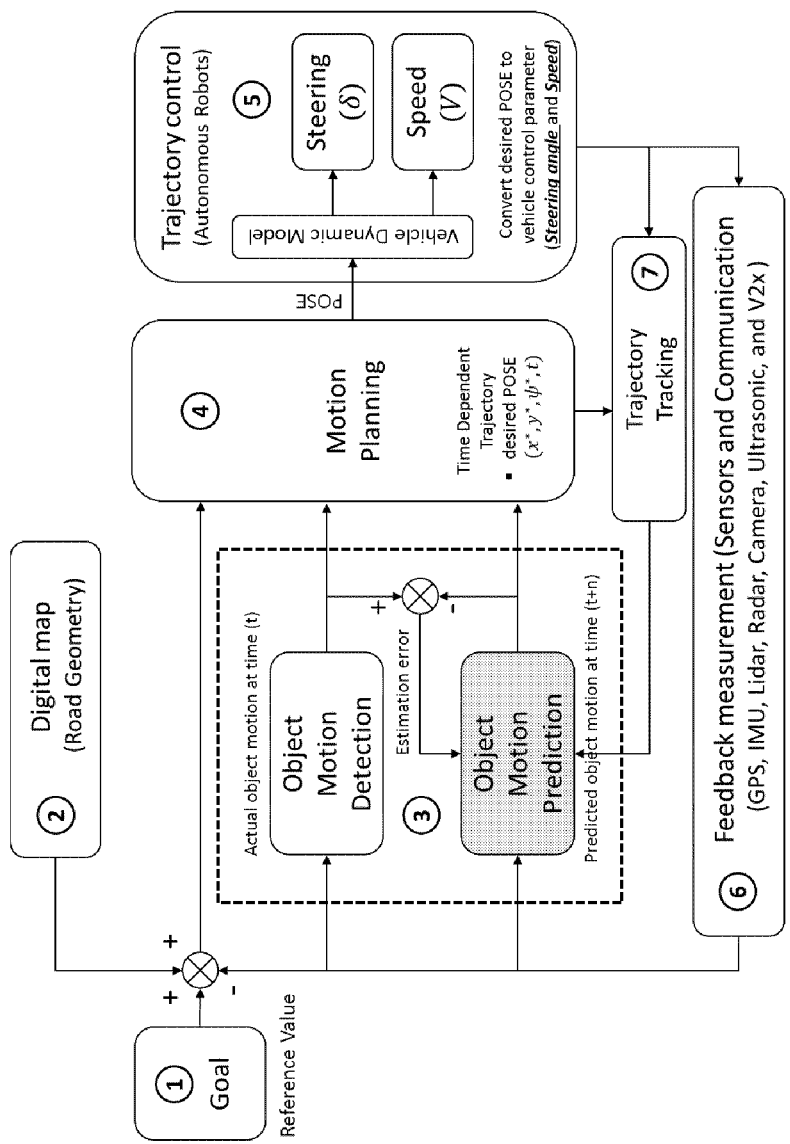
FIG. 3 shows a system according to an embodiment of the present invention.

FIG. 3 shows a system according to an embodiment of the present invention.

In FIG. 3, a system architecture for an object motion prediction application is shown. In FIG. 3, the sensor measurement is predicted, i.e. what the sensor will be read in the next timing step instead of conventionally predicting the outcome of the object movement. The system architecture of the object motion prediction can be illustrated with the closed loop block diagram in FIG. 3.

It includes six main blocks. Block (1) includes the mission goal (reference value), where the object shall go. Block (2) provides map data, e.g. a digital map, provided by a database in form of the road geometry and landmark environment. In Block (3) the input from a Feedback measurement Block (6)

is received and the object motion in the future time is predicted and corrected as an output to the motion planning in Block (4). Block (5) provides a trajectory control for the object receiving the time dependent trajectory from Block (4) and generating the actual vehicle control parameters, Steering angle and Speed. Block (7) provides the update future trajectory of the vehicle, based on the planned trajectory and the current vehicle state, to the Object Motion block (3).

Figure 4:
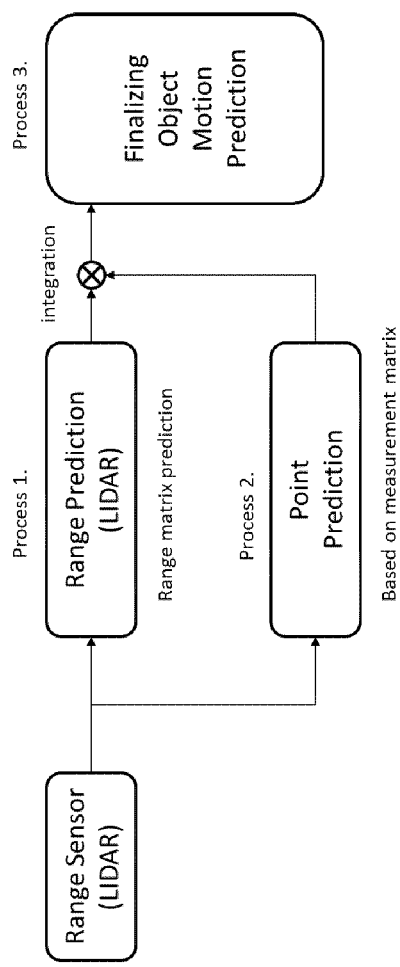
FIG. 4 shows part of the system according to a further embodiment of the present invention.

FIG. 4 shows part of the system according to a further embodiment of the present invention.

In FIG. 4, object motion in form of a block diagram is shown. Block (3) includes at least three prediction processes.

1. Process 1: Range matrix prediction: This is the sensor measurement prediction process. It takes input data from the range sensor (e.g. a LIDAR sensor) at the current measurement time (t) and predicts the future sensor reading. Based on the predicted sensor readings, the object movement is computed.
2. Process 2: Point prediction: This is the object location prediction process, which uses a clustering algorithm. It takes input data from a range sensor (LIDAR) at the current measurement time (t). Points are clustered in clouds to find the representing point of the object and predicting the new cluster in the future time, based on current and historical clusters. Then the object point of this new cluster is found.
3. Process 3: Finalizing object motion prediction is the merging of the results of two point predictions according to processes 1 and 2. This process 3 integrates the prediction of the two previous processes 1 and 2 and assigns a new position to each point and an associated standard deviation derived by the previous processes 1 and 2. This block 3 receives also the vehicle current and future position; this information is used to correct, e.g. obstacle positions.

Figure 5:
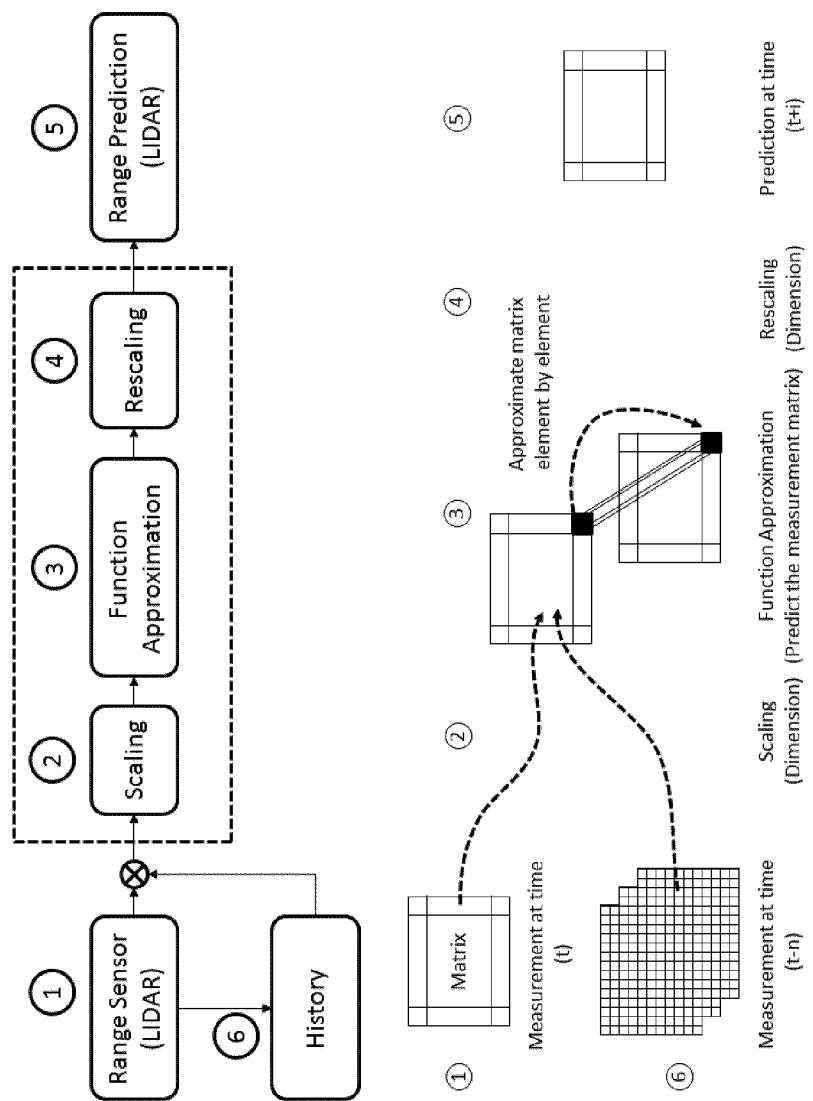
FIG. 5 shows part of a method according to an embodiment of the present invention.

FIG. 5 shows part of a method according to an embodiment of the present invention.

In FIG. 5, in more detail the Process 1, i.e. the range matrix prediction is described.

Range prediction is performed by predicting the future range sensor measurement, e.g. as from a LIDAR sensor. The prediction includes the following steps:

Training the prediction system with the historical measurement data, depicted with reference sign 6. The historic and current sensor measurements are accumulated and transmitted to a training system. Based on this information the training system computes a new configuration of a predicting entity. The configuration can be updated at periodic times, continuously or on specific condition, as for example when computational resources are available.

Using the historical data to predict the trend of the current sensor reading.

Determining the prediction error by comparing the current sensor measurement with the predicting value.

Correcting the predicting trend. Each reading has a variance that is converted into a point variance.

Predicting the future sensor measurement based on the corrective trend with the Gaussian Process Approximation, depicted with reference sign 3.

Transform the predicted range measurement to an actual point location.

Actual measured data from the sensor (reference sign 1) and historical data are combined together to predict the trend of the current sensor reading. Prediction errors are determined and the predicting trend is corrected. Then after scaling the current and historic measurement data (reference sign 6) the corrective trend using Gaussian Process Approximation (reference sign 3) is used for predicting the future sensor measurement. After rescaling (reference sign 4) this results then in the range prediction (reference sign 5).

Figure 6:
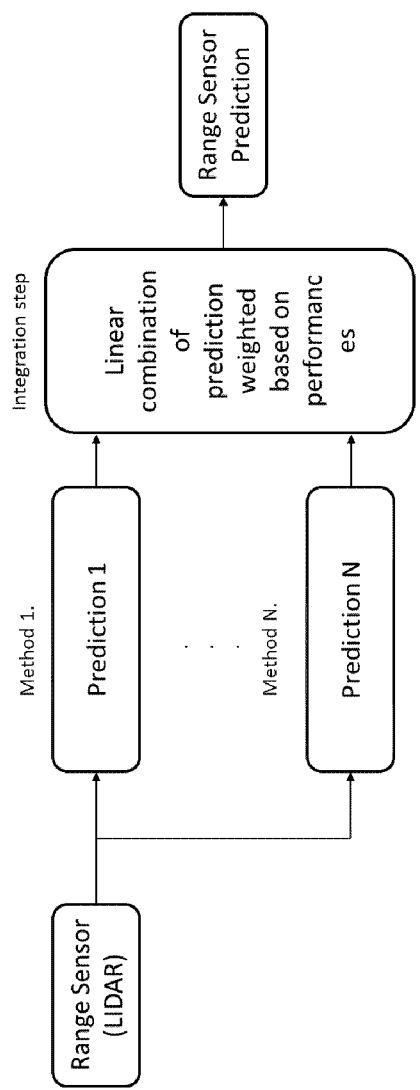
FIG. 6 shows part of a method according to a further embodiment of the present invention.

Here in FIG. 5, a mapping of the information from the future instant is based on the Gaussian Process Approximation. To improve performance, a parallel stage that used spatial ARIMA predictor may be used and the two predictions based on different methods are then integrated. Other methods that can additionally or alternatively be used as prediction component are e.g. random forest or bootstrapped neural networks. The final prediction is computed by e.g. a linear combination of each method, where the weight may be, e.g. inversely proportional to the error of prediction. Some of the prediction methods can be trained offline to reduce the computational requirement of combining multiple predictions. Such an ensemble prediction based on the plurality of prediction methods is schematically shown in FIG. 6.

Figure 7:
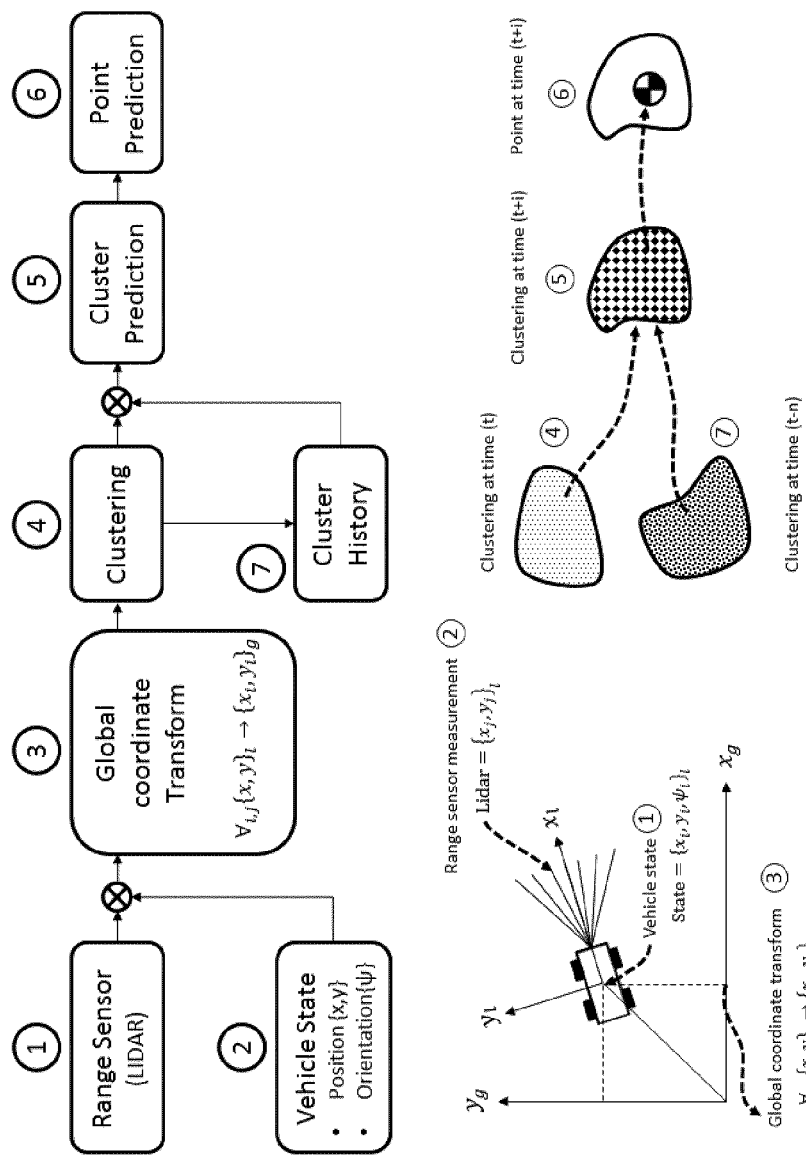
FIG. 7 shows part of a method according to a further embodiment of the present invention.

FIG. 7 shows part of a method according to a further embodiment of the present invention.

FIG. 7 the Process 2, i.e. the point prediction based on clustering is described as shown in FIG. 4.

Due to the raw measurement the data from sensors, from trajectory tracking and from the object motion detection includes a plurality of (data)points. The process predicts the future object motion by using a (data)point clustering method and finding the representing point of the object in the future cluster.

Predicting the future object motion is performed by the following steps:

Transmitting (reference sign 3) all measurement data in vehicle coordinates, range data form range sensor measurements (reference sign 2) and vehicle state data (reference sign 1) to global coordinates. In other words, the sensor measurement at the current time is respected to a vehicle coordinate, so in order to use this sensor information, all sensor measurement data has to be transformed into a global coordinate, to have a common reference. This process may done by a general conventional technique.

Clustering (reference sign 4) points of the current measurement by taking into consideration the size of the points (distance). In other words, after obtaining global information of sensor measurement, the resulting point cloud is interpreted to objects by clustering them into a group, for which a conventional clustering technique i.e, k-means, dbscan (density based) or the method according to an embodiment of the present invention based on statistical model, density, mean and variance shown in FIG. 8.

Clusters at successive time are matched

Predicting the future cluster (reference sign 5) based on using the current cluster and historical clusters (reference sign 7). In other words, a cluster movement is predicted in advance e.g. 5-10 s ahead of the current cluster, using the historical cluster data from the previous times.

Clusters movement is processed e.g. using Kalman filter for object tracking, Optical flow or according to an embodiment of the present invention based on machine learning like an evolution algorithm.

Predicting the future representing points of the objects (reference sign 6). The point movement (represented by the shift vector) is derived from the cluster motion, where it belongs. Each point may be assigned a new position and a variance. In other words, the last step is to predict a point that can represent an object i.e., the center of gravity of the cluster is assumed to be a center of gravity, 'CG', of an object. (This can be done by a conventional CG calculation method).

To summarize, the cluster is predicted before a point is predicted in contrast to a conventional algorithm/method determining a point directly without clustering process. A point cloud is always contaminated with noise either from internal or external disturbances, e.g. caused by sensor sensitivity. A point cloud is dynamic, i.e. it can split or merge over time. It means that predicting a point directly from a point cloud may result in high fluctuations when a point cloud splits or merges, but using clustering enables stability, less fluctuation in point prediction, and provides more accurate future object movement prediction.

Figure 8:
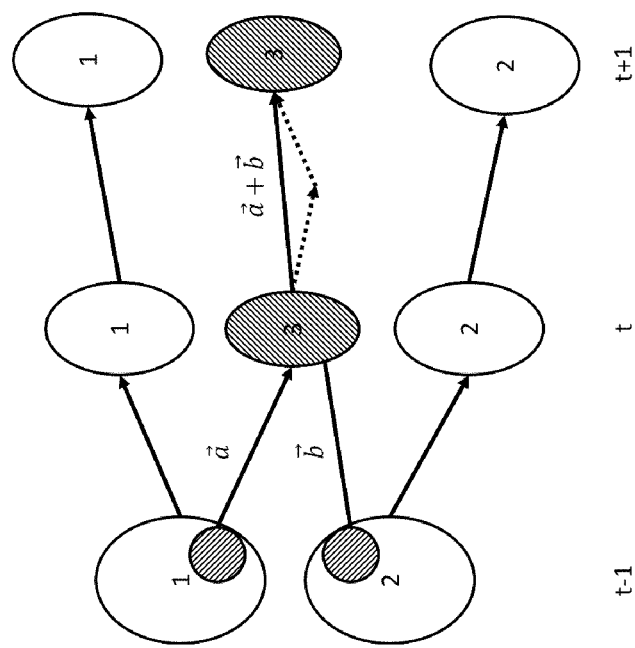
FIG. 8 shows part of a method according to a further embodiment of the present invention.

FIG. 8 shows part of a method according to a further embodiment of the present invention.

In FIG. 8 the principle of clustering prediction is shown at different times.

Since single point motion prediction may be not reliable, group point prediction may be used where the groups of points are based on clustering. Since groups disappear, merge or split on successive instants of time, a transition matrix is used. The entries of the matrix represent the probability of transition of each cluster for successive instants of time. The transition probability is used to derive the location of centroid of clusters in the future as described in FIG. 8.

After performing process 1 and 2, Process 3, i.e. finalizing object motion prediction, combines the two predictions results of the object prediction from current and future LIDAR measurement.

The output of a single predicting entity may be transmitted to a combination system being adapted to compare the results and decides the most like object position with its associated error for each of the time instant in the future horizon.

For finalizing the future object motion:
 Matching the points from two methods is performed according to the following:
  If a point has not been matched, his prediction variance gets the maximum, but its future position is considered.
  If a point is reproduced, i.e. matched in the two methods, the variance is proportional to the variance of the two predictions and the distance.
 Correcting the object location based on the corrected trajectory according to the matched points.

Figure 9:
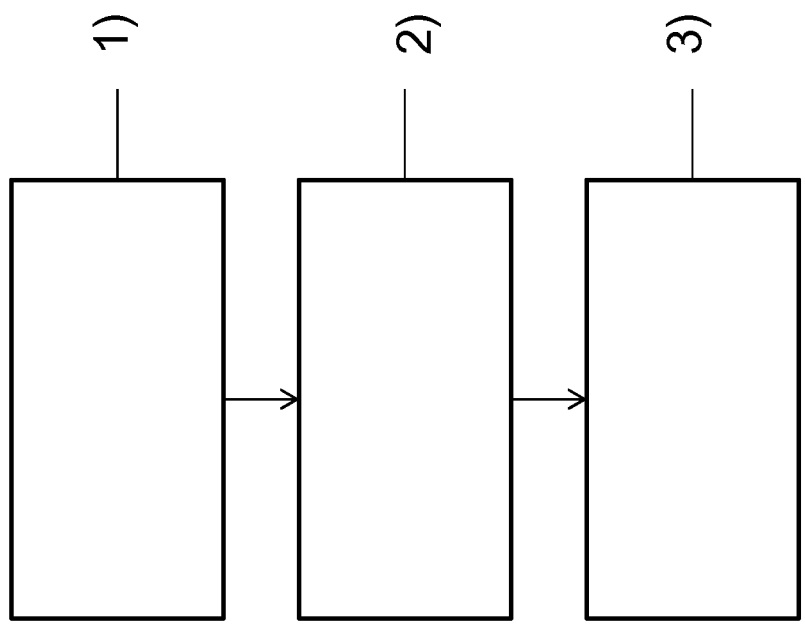
FIG. 9 shows steps of a method according to a further embodiment of the present invention.

FIG. 9 shows steps of a method according to a further embodiment of the present invention.

In FIG. 9 a method for computing the position of the object in future instant of time is shown including the steps of:
 1) Predicting the sensor measurement, using approximation function,
 2) Predicting the object motion, using a clustering-based method,
 3) Combining two prediction results for achieving the future object motion,
where the update trajectory is used from a driving module providing trajectory tracking to improve accuracy of the prediction and where the output of the motion planning may be changed for autonomous and automated driving. The planned trajectory may be considered in the single prediction methods, i.e. method for sensor measurement prediction and method for object motion prediction and in a combination system to compensate for the object future motion. The motion plan generated by a motion planner may used by a vehicle maneuvering and trajectory control system to steer, accelerate and decelerate a vehicle.

In summary the present invention provides or enables:
 1) An object motion prediction that uses range measure prediction:
  a. Training function with historical LIDAR data for sensor measurement prediction.
  b. Online prediction of the future LIDAR measurement based on function approximation
  c. Gaussian Process Function approximation
  d. Combination (ensemble) of multiple predictors (prediction methods: Spatial ARIMA, Random Forest, Bootstrapped Neural network).
 2) Combination of prediction method results, which includes range and physical predictors, for higher accuracy and robust object motion prediction.

In summary, the present invention enables motion planning of autonomous robots in particular resulting in more precise future known circumstances. Even further the present invention provides a continuous trajectory. Further the present invention provides a stable objection motion prediction system in which steering, heading and speed can be smoothly changed, i.e. a robot will not hit an expected future, object. Even further the present invention provides increased robustness of prediction reducing the error and variance by combining a range and point prediction.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for predicting a future motion of an object, the method comprising:
   computing, using a first process, a first predicted motion of the object between a current time and a future time, the first process comprising:
      predicting, based on current measurement data of one or more range sensors, future range sensor readings, and
      computing, based on the predicted future range sensor readings, the first predicted motion of the object;
   computing, using a second process, a second predicted motion of the object between the current time and the future time, the second process comprising:
      a previous point cloud corresponding to a previous time has already been generated;
      generating a future point cloud corresponding to a future time, before the future time has occurred, based on the current and previous point clouds, wherein the future point cloud represents a prediction;
      after generating the future point cloud but before the future time has occurred, identifying the object within the future point cloud so as to predict a location of the object at the future time;
      computing, based on the location of the object within the future point cloud, the second predicted motion of the object; and
   predicting, based on the first predicted motion of the object and the second predicted motion of the object, the future motion of the object.

2. The method according to claim 1, wherein the predicting the future range sensor readings is further based on historic measurement data of the one or more range sensors.

3. The method according to claim 1, wherein the predicting, based on current measurement data of one or more range sensors, future range sensor readings includes predicting respective method-dependent future range sensor readings using at least two different prediction methods.

4. The method according to claim 3, wherein the predicting, based on current measurement data of one or more range sensors, future range sensor readings further includes weighing and combining the respective method-dependent future sensor readings of the at least two different prediction methods to provide the predicted future range sensor readings.

5. The method according to claim 1, wherein the predicting, based on current measurement data of one or more range sensors, future range sensor readings includes using Gaussian Process Approximation to correct preliminary predicted future range sensor readings.

6. The method according to claim 1, wherein motion feedback of the object is included when computing the predicted motion of the object.

7. The method according to claim 1, wherein the one or more range sensors include LIDAR sensors.

8. The method of claim 1, comprising controlling a speed and a trajectory of an autonomous vehicle based on the predicted future motion of the object.

9. The method of claim 8, wherein the one or more range sensors are mounted to the autonomous vehicle.

10. The method of claim 8, comprising generating a continuous route for the autonomous vehicle from the current time to the future time based on the predicted future motion of the object and controlling the speed and trajectory of the autonomous vehicle based on the continuous route.

11. An autonomous vehicle comprising one or more processors configured to perform the method of claim 10 by controlling a motor of the autonomous vehicle.

12. A non-transitory computer readable medium storing instructions configured to cause one or more processors to perform the method of claim 8.

13. An autonomous vehicle comprising one or more processors configured to perform the method of claim 1.

* * * * *